United States Patent [19]

Parisi

[11] Patent Number: 4,547,007
[45] Date of Patent: Oct. 15, 1985

[54] FUSE CARRIER UNIT FOR MOTOR VEHICLES

[75] Inventor: Ettore Parisi, Turin, Italy

[73] Assignee: Fiat Auto S.p.A., Turin, Italy

[21] Appl. No.: 441,009

[22] Filed: Nov. 12, 1982

[30] Foreign Application Priority Data

Dec. 3, 1981 [IT] Italy .............................. 53864/81[U]

[51] Int. Cl.[4] ............................................ E05C 17/52
[52] U.S. Cl. .................................. 292/84; 174/52 R;
248/293
[58] Field of Search ................. 292/303, DIG. 40, 84;
174/52 R

[56] References Cited

U.S. PATENT DOCUMENTS

| | | | |
|---|---|---|---|
| 1,689,150 | 10/1928 | Menash | 292/303 |
| 3,081,118 | 3/1963 | Krause | 292/304 X |
| 4,371,743 | 2/1983 | Decker | 174/52 R |
| 4,482,176 | 11/1984 | Rider, Jr. et al. | 292/87 |

Primary Examiner—Richard E. Moore
Attorney, Agent, or Firm—Sughrue, Mion, Zinn, Macpeak & Seas

[57] ABSTRACT

A fuse box is articulated to the front wall of the passenger compartment of a motor vehicle so as to be pivotable between a downwardly inclined position and a substantially vertical lowered position for renewal of the fuses. Clasp means hold the fuse box in the inclined position and manual releasing means release the clasp means to allow the lowering of the fuse box.

11 Claims, 8 Drawing Figures

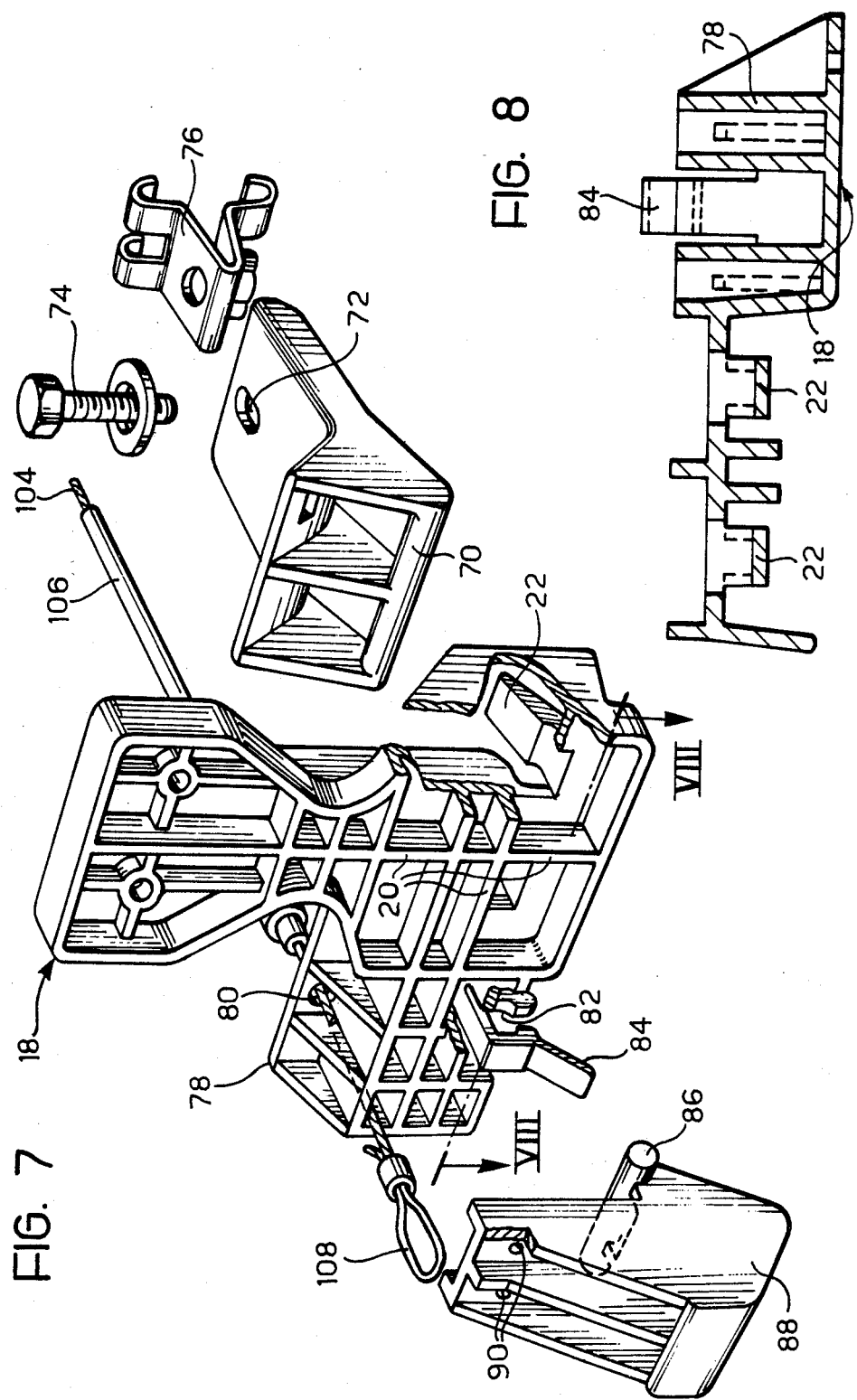

FUSE CARRIER UNIT FOR MOTOR VEHICLES

The present invention relates to fuse carrier units for motor vehicles, of the type comprising a fuse box and means for attaching the box to the structure of the motor vehicle, and particularly to the wall which defines the front part of the passenger compartment. This wall normally includes a substantially vertical lower portion which is connected to the floor of the compartment, and an upper portion which is also substantially vertical and, being offset inwardly of the compartment relative to the lower portion, is used for supporting a dashboard.

For reasons of practicality and convenience, the fuse box is normally arranged to be fixed rigidly against the lower portion of the wall, and the means for connecting the fuse box to this wall are conventionally constituted by screw or similar retaining members.

On the one hand, this arrangement ensures easy accessibility to the box for allowing the replacement of fuse elements contained therein but, on the other hand, presents a series of disadvantages due to the bulk of the fuse box within the passenger compartment and the risk of accidental damage to the box by the vehicle occupants. Moreover, the position of the fuse box is totally unsatisfactory from an aesthetic point of view.

The present object is to avoid the disadvantages mentioned above, by providing a fuse carrier unit for motor vehicles that is shaped so as to allow the arrangement of the fuse box in a zone of the front wall of the passenger compartment which is more favourable from the aspects of the reduction in bulk and protection against the risks of damage to the box itself, while nonetheless ensuring convenient accessibility of the fuse box for maintenance.

According to the invention, this object is achieved by virtue of the fact that the fuse box can be fixed to the wall defining the front of the passenger compartment of a motor vehicle so as to extend in a downwardly inclined position between the lower portion and the upper portion of this wall, and in that the attachment means for the fuse box include clasp means for retaining the box in the substantially horizontal position and releasing means associated with the clasp means for allowing the box to be brought into a substantially vertical position beneath the upper portion of the wall to allow any renewal of the fuse elements contained therein.

According to the invention, one end of the fuse box is attachable in a hinged manner to the upper portion of the wall, and the clasp means comprise a latch member carried by the opposite end of the box and a catch member which can be fixed to the lower portion of the wall to cooperate with the latch member.

The releasing means preferably comprise a control member which is manually operable to release the latch member from the catch member.

To advantage, the control member may include a remote control device cooperating with the catch member.

Further characteristics of the invention will become clear in the course of the detailed description which follows with reference to the appended drawings, provided purely by way of non-limiting example, in which:

FIG. 7 is an exploded perspective view illustrating a detail of FIG. 5 on an enlarged scale, and FIG. 8 is a cross-sectional view taken on the line VIII—VIII of FIG. 7.

Figure 1:
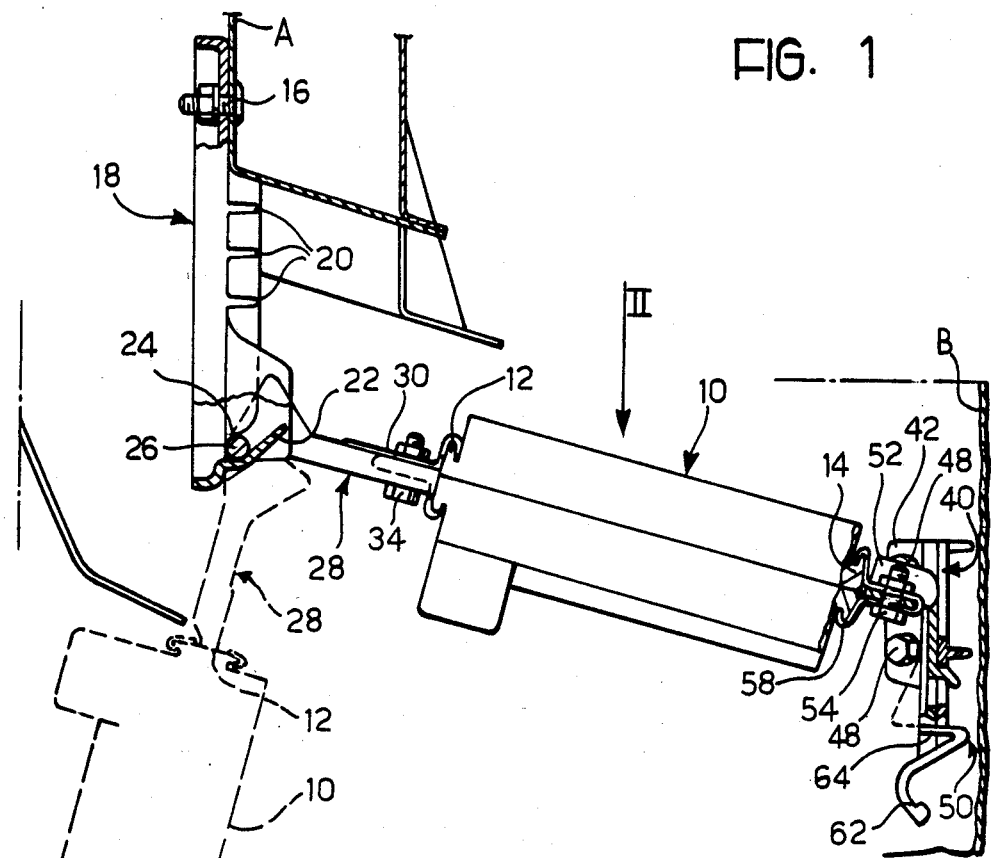
FIG. 1 is a partially-sectioned side elevational view of a fuse carrier unit for motor vehicles, according to the invention.
Figure 2:
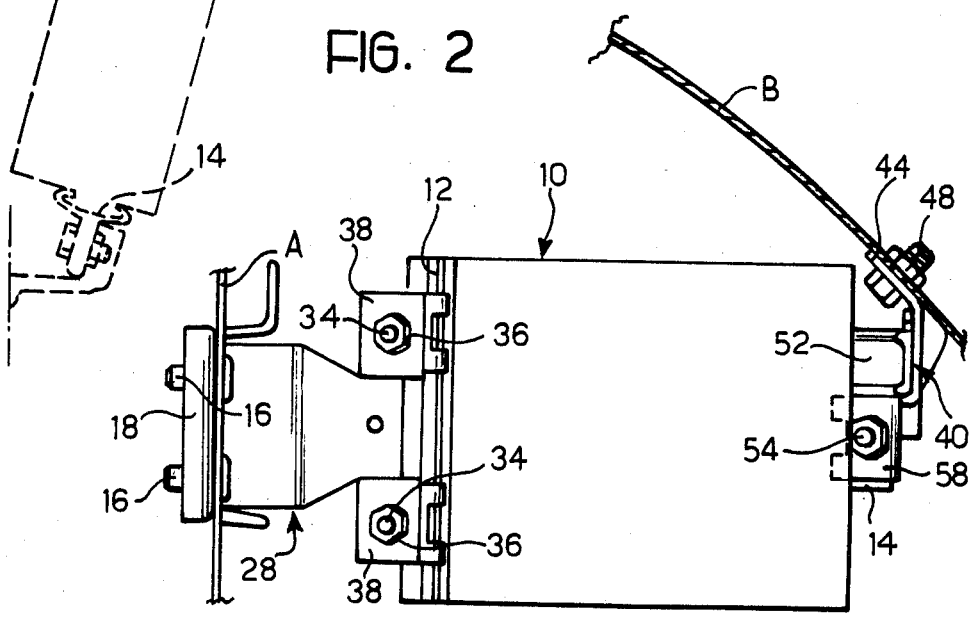
FIG. 2 is a plan view from above taken on arrow II in FIG. 1.

Referring initially to FIGS. 1 and 2, the upper portion and lower portion of a wall defining the front of the passenger compartment of a motor vehicle are indicated A, B respectively. The two wall portions A, B extend substantially vertically and are offset from each other such that the upper portion A is displaced inwardly of the compartment relative to the lower portion B.

A fuse box, generally indicated 10, contains in known manner a plurality of fuse elements connected in the various electrical circuits connecting an electrical power source to the various pieces of electrical equipment installed in the vehicle.

The fuse box 10 has a generally parallelepipedal shape and is provided, at its two opposing minor faces, with substantially T-shaped retaining projections 12, 14 respectively.

Figure 3:
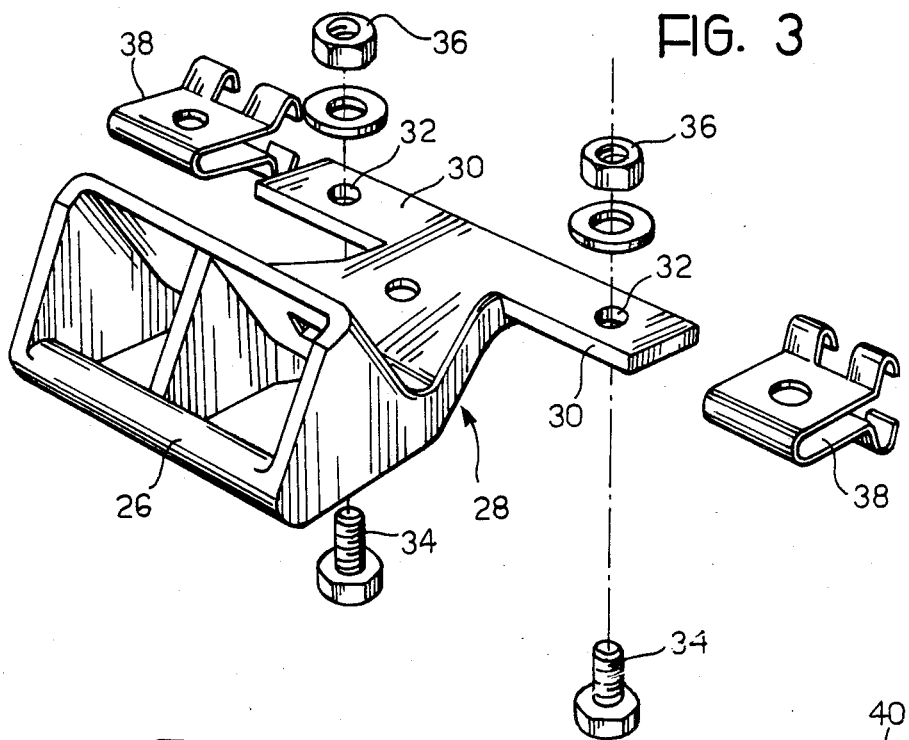
FIG. 3 is an exploded perspective view illustrating a detail of FIGS. 1 and 2 on an enlarged scale.

To the lower end of the upper wall portion A is fixed, by means of screws 16, a support member 18 of moulded plastics material which extends downwardly as an extension of the upper portion A. The support member 18 has stiffening ribs 20 and is further provided at its lower end with a spring tab 22 which projects outwardly towards the lower portion B and, together with the remaining part of the support member 18, defines a hinge seat 24. A hinge pin 26 carried at one end of a lever 28 illustrated in detail in FIG. 3 is snap-engaged in the hinge seat 24. The lever 28, which is also formed in a single piece by moulding from plastics material, has, at its end opposite the hinge pin 26, a pair of opposing transverse flanges 30 each with a through hole 32. Two retaining screws 34 are engaged in the two holes 32 and are provided with clamping nuts 36 to secure a pair of pincer clamps 38 which fix the retaining projection 12 of the fuse box 10 to the two side flanges 30, as clearly shown in FIG. 2. Thus, the fuse box 10 is connected to the support member 18 and hence to the upper wall portion A in such a way as to be pivotable about the axis of the pin 26. The snap-assembly of the latter in the hinge seat 24 allows the lever 28, and hence the fuse box 10, to be removed from and reassembled on the support member 18 simply and rapidly.

A moulded plastics retaining member 40 is fixed to the lower wall portion B at a level slightly lower than the support member 18. As illustrated in detail in FIG. 4, the member 40 is provided with a rectangular catch aperture 42 at the bottom and has a lateral tab 44 at the top with holes 46 for bolts 48 which fix it to the lower wall portion B.

A moulded plastics control member 50 has a flat portion 52 at one end having a central hole 53 in which is engaged a screw 54 provided with a clamping nut 56 for fixing a pincer clamp 58, which is identical to the two clamps 38, to the flat portion 52. The clamp 58 engages the retaining projection 14 to attach the control member 50 to the fuse box 10.

Figure 4:
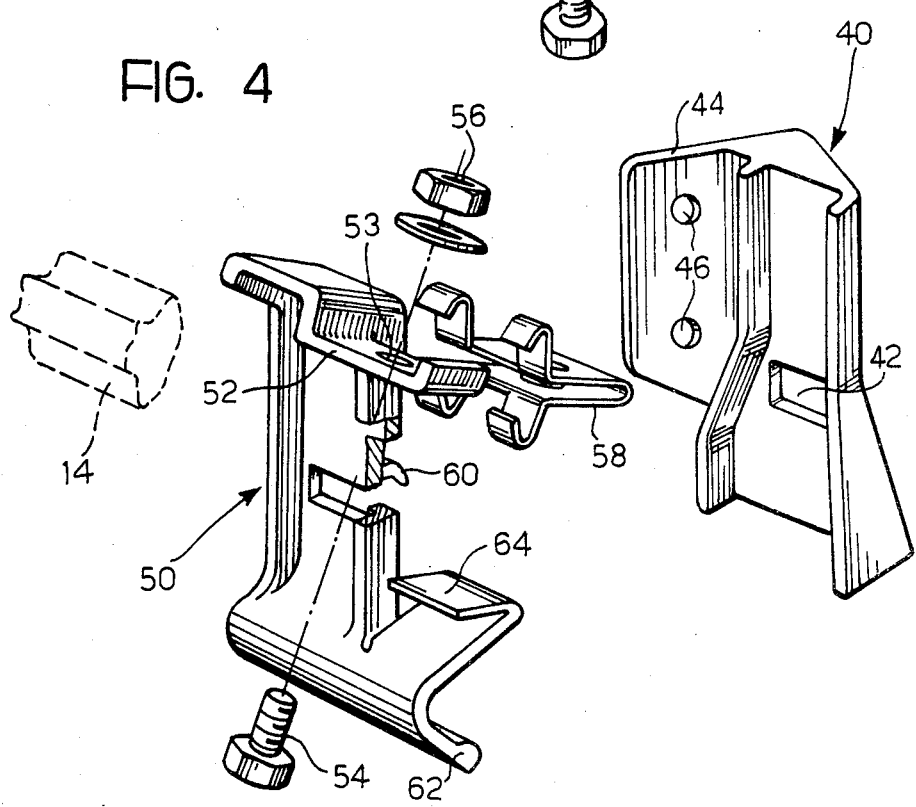
FIG. 4 is a view similar to FIG. 3 illustrating another detail of FIGS. 1 and 2.

As illustrated in detail in FIG. 4, the control member 50 has a central latch tooth 60 which projects outwardly and is arranged to cooperate with the aperture 42 of the member 40. The lower end of the control member 50 has a curved handgrip part 62 and a sprung gripping tab 64 above the latter.

In the installed position of the fuse box 10 illustrated in full outline in FIG. 1, the control lever 50 is located adjacent the member 40 with the latch projection 60 engaged in the aperture 42. The sprung tab 64 bears against the lower end of the member 40 so as to maintain the control member 50 firmly in position. The fuse box 10 therefore extends into the zone between the lower end of the upper wall portion A and the lower wall portion B, and is slightly downwardly inclined towards the latter. In this position, the box 10 does not present any bulk within the passenger compartment, is practically invisible to the occupant thereof, and is effectively protected against accidental damage.

Should it be necessary to renew a fuse element in the box 10, it suffices to release the latch projection 60 from the aperture 42 by pulling the control member 50 inwardly of the passenger compartment by means of the handgrip 62 until the sprung tab 64 disengages from the retaining member 40 and the latch projection 60 is released from the aperture 42.

As a result of the release of the latch projection 60 from the aperture 42, the fuse box 10 can rotate downwardly about the axis of the hinge pin 26 until it is disposed in the position illustrated in broken outline in FIG. 1. In this position, the box 10 extends more or less vertically beneath the upper wall portion A and may be reached easily from inside the passenger compartment. Should it be necessary to carry out more complicated maintenance or to replace the entire box 10, it suffices to disengage the hinge pin 26 of the lever 28 from the hinge seat 24 of the support member 18. This operation can be carried out easily and rapidly and allows the box 10 to be removed from the passenger compartment of the vehicle.

The release of the fuse box 10 from the lower wall portion B may be effected by using the remote control device 66 instead of the control member 50, as illustrated in detail in FIGS. 5 to 8. In these Figures, parts identical or similar to those illustrated in FIGS. 1 to 4 are indicated by the same reference numerals for simplicity, and only the differences will be described in detail below for brevity.

In this case, the fuse box 10 is again attached to the support member 18 fixed to the upper wall portion A by means of a lever 68 similar to the lever 28 described above, which has a hinge pin 70 rotatably snap-engaged in a pair of hinge seats 24. As shown in detail in FIG. 7, however, both the support member 18 and the lever 68 differ slightly from the corresponding elements of FIGS. 1 to 4. Indeed, the end of the lever 68 opposite the hinge pin 70 is not provided with lateral lugs but has a central hole 72 in which a screw 74 is inserted for fixing a single pincer clamp 76 identical to the clamps 38, 58, which engages the retaining projection 12 of the box 10.

The support member 18, which again in this case has stiffening ribs 20 formed by moulding, has a lateral appendage 78 provided at the top with a through hole 80 and at the bottom with a hinge seat 82 defined by a sprung tab 84 projecting inwardly of the passenger compartment. A pin 86 carried by a moulded plastics control lever 88 is snap-engaged in the seat 82, the lever having a pair of through holes 90 at its upper end the function of which will be clarified below.

The retaining member 92 fixed to the lower wall portion B is formed by a moulded plastics body having an upper transverse wall 94 with a central through hole 96 and a lateral bearing flange 98. Furthermore, to the upper part of the body 92 is connected a wire or metal strip 100 having a sprung catch arm 102. The arm 102 is displaceable between an operative rest position, shown by the continuous line in FIG. 6, and a deformed inoperative position, shown in broken outline in the same Figure, by means of a control cable 104 forming part of the remote control device 66. This control cable 104 is anchored at one end to the arm 102 and is slidable in a sheath 106 which bears at its respective ends against the lateral flange 98 and the appendage 78 of the support member 18 in correspondence with the hole 80. The other end of the cable 104 passes through this hole 80 and forms a loop 108 fastened to the lever 88 through the two holes 90.

In this case, the latch member carried by the fuse box 10 is constituted by a cylindrical pin 110 to which is fixed a pincer clamp 112 identical to the clamps 38, 58, 76 described above, which engages the retaining projection 14 of the box 10. The pin 110 is provided on its side opposite the clamp 112 with a latch head 114 of substantially frusto-conical shape.

Figure 5:
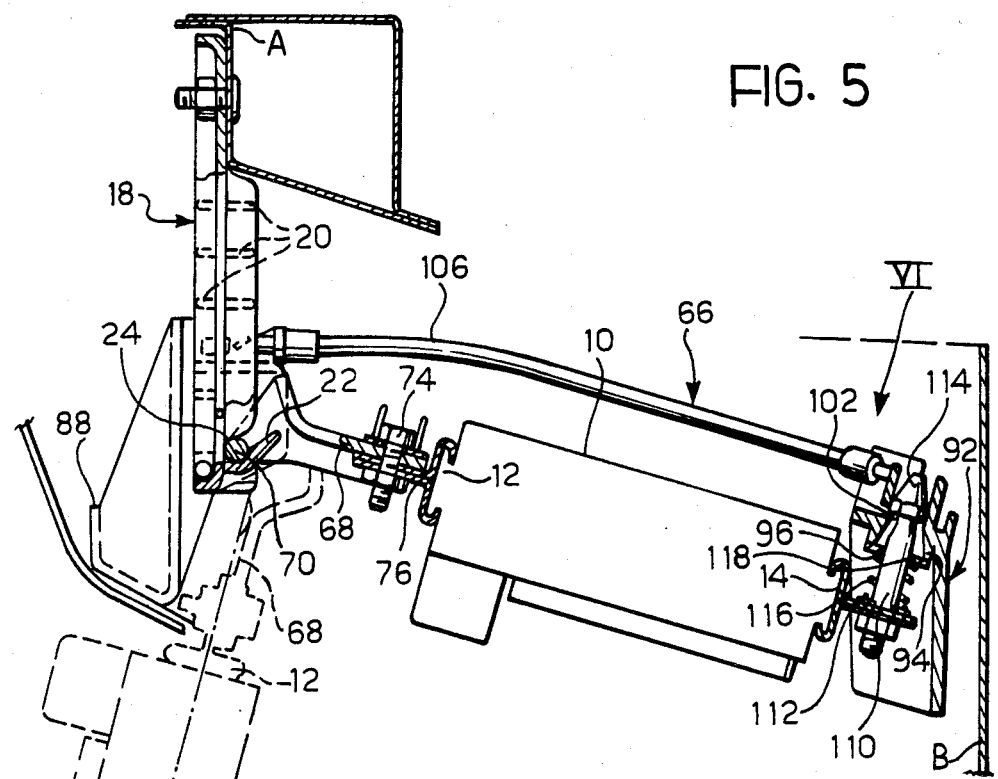
FIG. 5 is a view similar to FIG. 1 illustrating the fuse carrier unit according to the invention provided with a remote control device.
Figure 6:
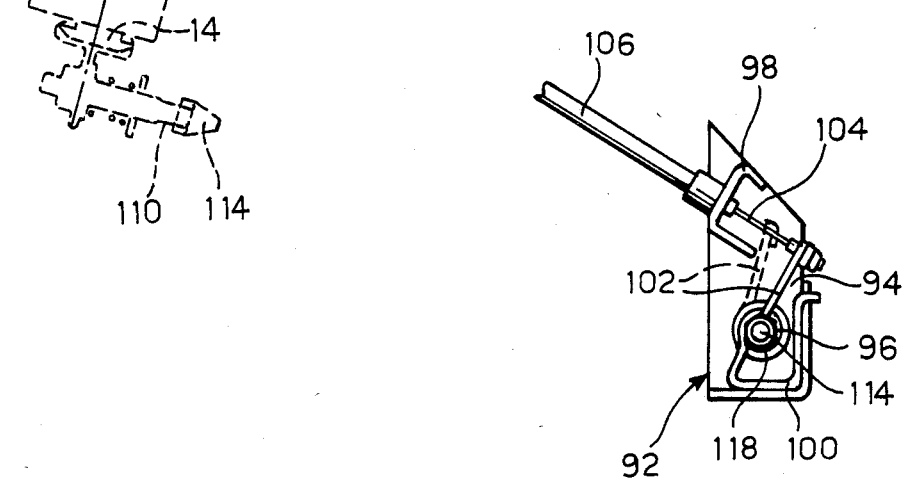
FIG. 6 is a plan view from above taken on arrow VI in FIG. 5.

In the position illustrated in FIGS. 5 and 6, the pin 110 passes through the hole 96 of the aperture 94 and is retained in this position by the engagement of the arm 102 of the strip 100 beneath the latch head 114. A helical compression spring 116, which surrounds the pin 110 and reacts between the clamp 112 and an annular plate 118, urges the head 114 resiliently against the arm 182. Thus, the fuse box 10 is locked relative to the two wall portions A, B and extends therebetween with a slight downward inclination.

In order to release the box 10 from the lower wall portion B and allow its rotation into the maintenance position illustrated in broken outline in FIG. 5, it suffices to rotate the control member 88 slightly about the axis of the hinge pin 86, thus exerting a pull on the cable 104. Due to this pull, the arm 102 of the strip 100 is deformed into the position illustrated in broken outline in FIG. 6, so as to release the head 114 of the pin 110. Due to the action of the spring 116, the pin 110 disengages downwardly from the hole 96, allowing the box 10 to rotate. Again, in this case, the box 10 may be removed easily by the disengagement of the pin 70 from the two hinge seats 24 of the support member 18.

In order to return the fuse box 10 to the locking position, it suffices to rotate it upwardly from the position illustrated in broken outline in FIG. 1 or FIG. 5, and re-engage the respective latch member 60, 114 with the corresponding catch member 41, 102. In the case of both FIG. 1 and FIG. 5, this engagement is achieved automatically by a slight upward pressure on the fuse box 10.

What is claimed is:

1. Fuse carrier unit for motor vehicles, comprising a fuse carrier box and means for attaching the box to a wall which defines the front of the passenger compartment of a motor vehicle and includes a substantially vertical lower portion and substantially vertical upper portion offset inwardly of the passenger compartment relative to the lower portion, wherein the fuse carrier box is fixable to said wall so as to extend in a downwardly inclined position between said upper portion and said lower portion, and the attachment means for the fuse carrier box include support means for moveably supporting said fuse carrier on said upper portion and clasp means for retaining the box in the downwardly inclined position and releasing means associated with the clasp means for allowing the box to move on said support means into a substantially vertical position beneath the upper portion of said wall to permit any renewal of the fuses contained in said box.

2. A fuse carrier unit as defined in claim 1, wherein one end of the fuse box is attachable in a hinged manner to the upper portion of said wall, and said clasp means include a latch member carried by the opposite end of the fuse box and a catch member fixable to the lower portion of said wall to cooperate with said latch member.

3. A fuse carrier unit as defined in claim 2, wherein the attachment means include a support member fixable to the upper portion of said wall and a lever carried by the end of the fuse box opposite the latch member and articulated at one end to the support member.

4. A fuse carrier unit as defined in claim 3, wherein the support member includes retaining elements for releasable snap-engagement with the articulating end of said lever.

5. A fuse carrier unit as defined in claim 2 or claim 3, wherein the fuse box has shaped retaining projections at two opposite ends, and the attachment means include fixing clamps which connect said retaining projections to the lever and the latch member respectively.

6. A fuse carrier unit as defined in claim 2 or claim 3, wherein the releasing means comprise a control member which is manually operable to release the latch member from the catch member.

7. A fuse carrier unit as defined in claim 6, wherein the latch member is carried directly by the control member.

8. A fuse carrier unit as defined in claim 7, wherein the control member comprises a lever with a rigid projection which constitutes said latch member, and a retaining body fixable to the lower portion of said wall defines an aperture which constitutes said catch member engageable by said projection, said control lever being further provided with a resilient tab which cooperates with said retaining body to retain the rigid projection in engagement with said aperture.

9. A fuse carrier unit as defined in claim 6, wherein the control member includes a remote control device connected to the catch member.

10. A fuse carrier unit as defined in claim 9, wherein: the latch member is constituted by a pin having an enlarged head; a helical biassing spring surrounds said pin; the catch member includes a body fixable to the lower portion of said wall, said body having a bracket with a hole for the introduction of the head of said pin, against which said spring bears, and a resilient arm connected to said bracket for engagement with the head; a control cable is anchored to said resilient arm at one end, said cable being slidable in a sheath connected between the support member and said body, and wherein the other end of the cable is connected to a control lever which is connected to the support member, said lever being operable to effect the movement of the resilient arm away from the head of the pin and consequently the disengagement of the latter from said aperture under the action of said spring.

11. A fuse carrier unit as defined in claim 10, wherein the support member includes a retaining element for the releasable snap-engagement of the control lever.

* * * * *